P. C. ROBERTS.
CALF MUZZLE.
APPLICATION FILED SEPT. 24, 1908.
914,881.
Patented Mar. 9, 1909.
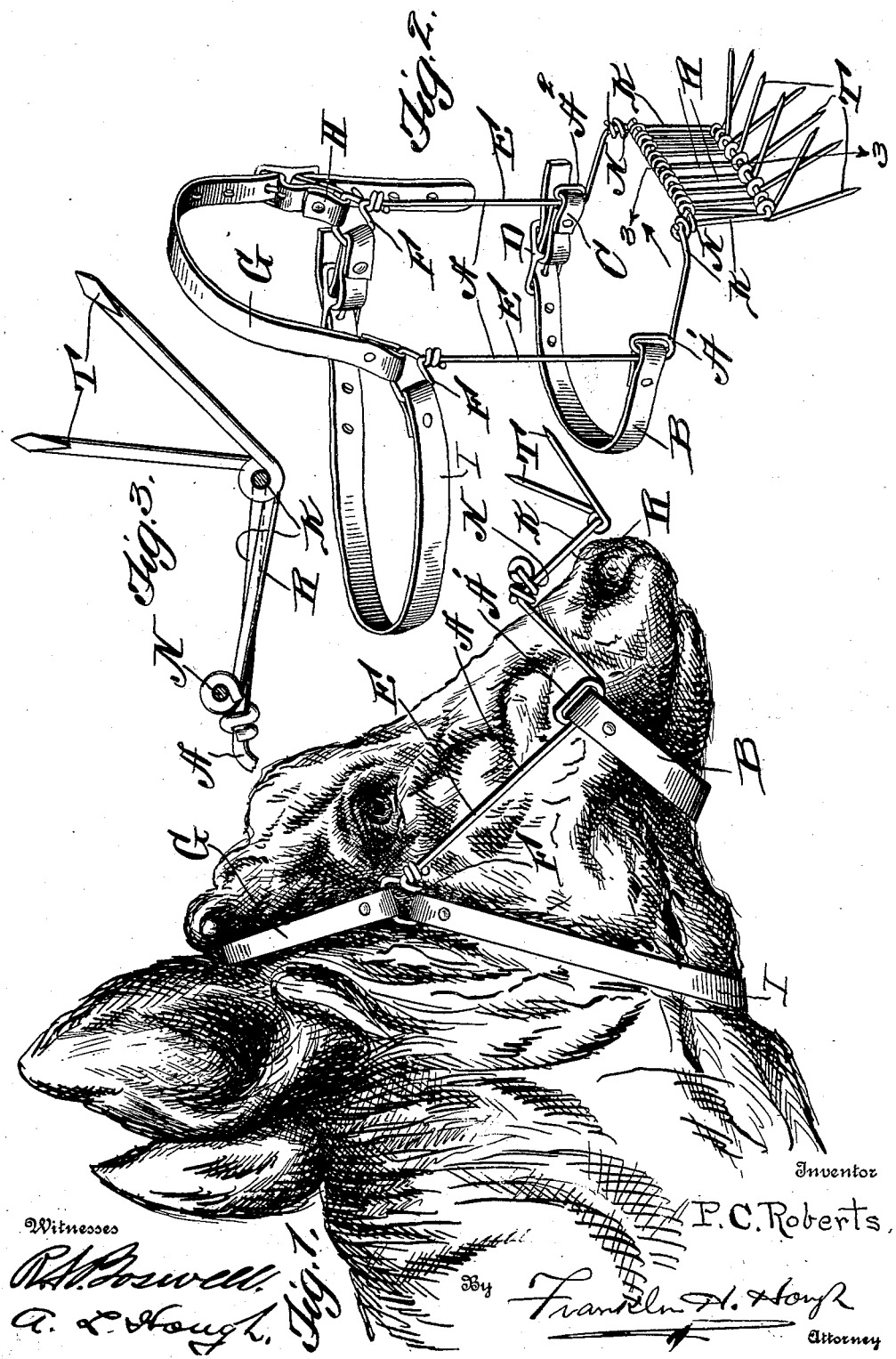

UNITED STATES PATENT OFFICE.

PAXSON C. ROBERTS, OF TRENTON, NEBRASKA.

CALF-MUZZLE.

No. 914,881.     Specification of Letters Patent.     Patented March 9, 1909.

Application filed September 24, 1908. Serial No. 454,568.

*To all whom it may concern:*

Be it known that I, PAXSON C. ROBERTS, a citizen of the United States, residing at Trenton, in the county of Hitchcock and State of Nebraska, have invented certain new and useful Improvements in Calf-Muzzles; and I do hereby declare the following to be a full, clear, and exact description of the invention, such as will enable others skilled in the art to which it appertains to make and use the same, reference being had to the accompanying drawings, and to the characters and figures of reference marked thereon, which form a part of this specification.

This invention relates to new and useful improvements in calf weaning devices or muzzles and comprises a simple and efficient device of this nature comprising various details of construction, combinations and arrangements of parts which will be hereinafter fully described and then specifically defined in the appended claim.

I illustrate my invention in the accompanying drawings, in which:—

Figure 1 is a perspective view showing the application of my invention to the head of a calf. Fig. 2 is a view of the muzzle detached, and Fig. 3 is a sectional view on line 3—3 of Fig. 2.

Reference now being had to the details of the drawings by characters, A designates a wire which is bent to form loops A' and A² in the former of which one end of the strap B is fastened, while in the latter a strap C is secured to which is fastened a buckle D to be engaged by said strap B. Said wire has two parallel portions, designated by letters E, adapted to extend along adjacent to the jaws of the animal and each end terminates in a loop F, in one of which one end of the strap G is fastened while in the other loop a buckle carrying strap H is fastened, which strap G is adapted to pass about the head of the animal in the manner shown in Fig. 1 of the drawings. Said wire is bent substantially at right angles at corresponding ends of the loops to the parallel portions E and thence is bent downwardly at right angles forming a bail shaped portion, the end of which is adapted to be positioned above the end of the nose of an animal on which the device is adjusted. A wire N has its ends twisted about said bail-shaped portion as shown and wires R having coils therein engaged by said wire N and also by the bail-shaped wire are mounted side by side, each having a free end T projecting as a spur, as shown, thus forming means for pricking into a cow in the event of the calf throwing the spurs against the animal. In order to hold the muzzle upon the head of an animal, a suitable throat latch I is fastened thereto and adapted to buckle about an animal, as will be readily understood.

When the device is applied to the head of a calf in the manner shown, it will be noted that it will not interfere with the calf's eating or drinking, the spur carrying portion being above the nostrils and out of the way of the mouth of the animal.

What I claim to be new is:—

A device for weaning calves, comprising a wire bent at its longitudinal center to form a bail-shaped portion, the wire forming the sides of the opposite edges being bent downward and rearward at right angles to said bail-shaped portion, thence turned into coils forming loops, a chin strap engaging said loops, the ends of the wires thence extending parallel to each other and to the plane in which the bail-shaped portion is disposed and terminating in loops for engagement of straps, a cross wire coiled about the sides of the bail-shaped member adjacent to said right angled portions, a spur wire having eyes at corresponding ends for the reception of said cross wires and eyes through which the end of the bail-shaped portion extends, the end of the bail-shaped member adapted to be held in a fixed position above the nostrils of the animal to which the device is attached, as set forth.

In testimony whereof I hereunto affix my signature in the presence of two witnesses.

PAXSON C. ROBERTS.

Witnesses:
   R. A. GIBSON,
   GEO. M. LAURENCE.